United States Patent [19]
Bjorkman

[11] 3,773,561
[45] Nov. 20, 1973

[54] ISOLATION OF CELLS OF A BATTERY STACK TO PREVENT INTERNAL SHORT-CIRCUITING DURING SHUTDOWN & STANDBY PERIODS

[75] Inventor: Harry K. Bjorkman, Birmingham, Mich.

[73] Assignee: Occidental Energy Development Company, Whitcomb, Madison Heights, Mich.

[22] Filed: Nov. 18, 1971

[21] Appl. No.: 200,122

[52] U.S. Cl. ............................... 136/86 A, 136/160
[51] Int. Cl. ......................................... H01m 27/12
[58] Field of Search ............... 136/86 A, 86 S, 86 E, 136/86 R, 162, 163, 160; 204/257, 269, 275; 137/625.28, 625.33; 251/61.1

[56] References Cited
UNITED STATES PATENTS

| | | |
|---|---|---|
| 2,598,207 | 5/1952 | Barley et al.................... 251/61.1 |
| 3,083,943 | 4/1963 | Stewart et al.................. 251/61.1 |
| 3,247,024 | 4/1966 | Tamminen........................ 136/160 |
| 3,312,238 | 4/1967 | Voit............................. 251/61.1 |

Primary Examiner—A. B. Curtis
Assistant Examiner—H. A. Feeley
Attorney—William J. Schramm

[57] ABSTRACT

Internal short-circuiting of a plurality of electric cells of a cell stack is prevented during shutdown or standby by sealing off the cells from electrical contact with each other by closing off inlet and outlet ports to isolate electrolyte portions in the individual cells. A preferred apparatus for carrying out the invention includes membranes which, in response to selective hydraulic pressure, open or close ports of the cell inlets and/or exits, to allow flow of electrolyte through the cells during charging or discharging and to prevent it during shutdown or standby.

5 Claims, 9 Drawing Figures

Patented Nov. 20, 1973 3,773,561
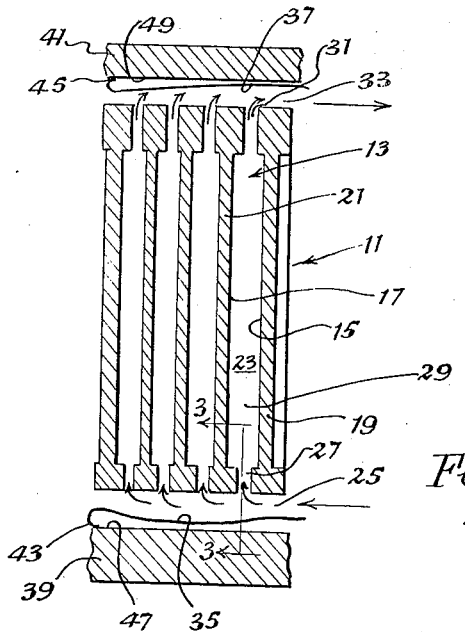
Fig.1.
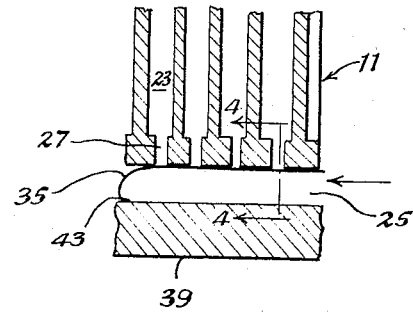
Fig.2.
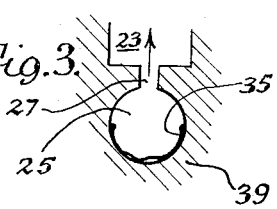
Fig.3. Fig.4.
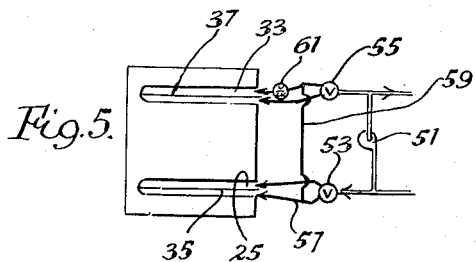
Fig.5.
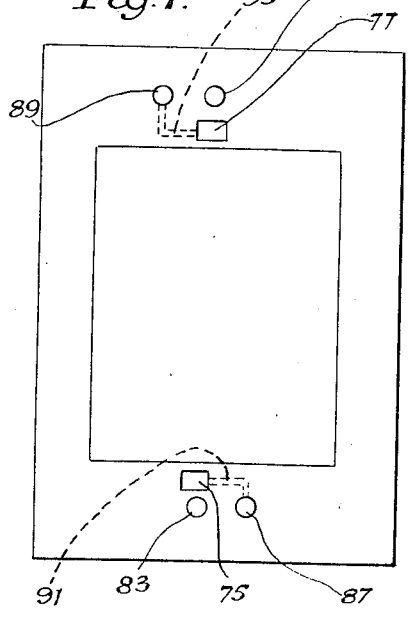
Fig.7.
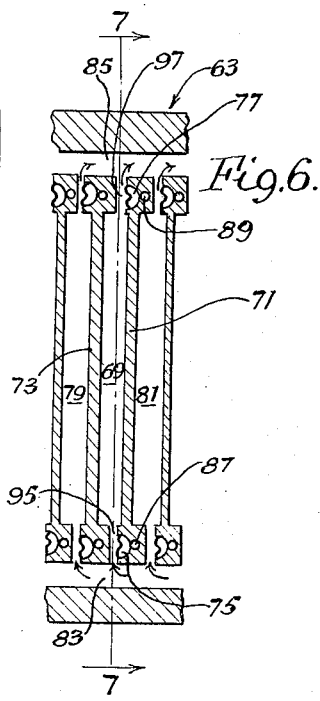
Fig.6.
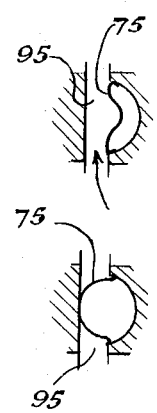
Fig.8.
Fig.9.

ISOLATION OF CELLS OF A BATTERY STACK TO PREVENT INTERNAL SHORT-CIRCUITING DURING SHUTDOWN & STANDBY PERIODS

BACKGROUND OF THE INVENTION

High energy density batteries have been produced which are rechargeable and which generate electricity by the reaction of a highly electropositive metal cathode and an elemental halogen anode, the anode being created by bringing the halogen, e.g., chlorine, in an aqueous metal halide electrolyte, into contact with a carbon or equivalent base. Between the two electrodes flows aqueous electrolyte containing the reactant halogen. Generally, in a stack or bank of cells, the aqueous electrolyte is pumped and manifolded to a plurality of inlets and is removed from the outlets through a similar manifold, and returned to the pump or other flow-creating apparatus. Although potentials in the various cells may be slightly different, this is not usually considered avoidable nor is it significantly detrimental during operation of the battery, while charging or discharging. However, when this type of battery or other batteries in which there is inter-cell communication between portions thereof by means of a mobile electrolyte, is not in use, when it is shutdown or at standby, there will be a loss of power due to such internal shorting and there may be tendencies for the electrodes to be pitted or to form dendrites, due to internal current flows.

SUMMARY OF THE INVENTION

Because of the disadvantages found to be resulting when electrical communication through the electrolyte occurs during shutdown, the present invention is directed to preventing such communication and the inter-cell flow of electrolyte during such a period. In accordance with this invention an apparatus is provided for preventing internal short-circuiting of a plurality of electric cells, which contain a plurality of inlets and outlets and have a common electrolyte, which includes means for sealing off the inlets and outlets of the cells by closing off the inlet and outlet ports and isolating the electrolyte portions in the individual cells, thus preventing electrolyte flow and electrical communication between the cells. Although such apparatus preferably includes pressure-responsive, flexible, synthetic organic polymeric membrances which are actuatable to allow flow or prevent it at the cell inlets and outlets, and although the invention is most applicable to high energy density cells in which an aqueous metal halide electrolyte carries dissolved elemental halogen and the halogen and elemental metal are converted to base metal and halogen ions in a reaction zone, thereby generating electricity at halogen and metal electrodes, the invention is applicable to other batteries in which the problem of inter-cell short-circuiting exists. The invention also relates to a process for preventing short-circuiting between electric cells of a battery or cell stack by isolating the individual cells by mechanical and electrical sealing means, similar to the mentioned pressure-responsive membranes.

DESCRIPTION OF THE PREFERRED EMBODIMENTS

The present invention and its mode of operation will be readily apparent from the following description, taken in conjunction with the accompanying drawing in which:

FIG. 1 is a central vertical section of a bank or stack of electric cells of a secondary battery, showing paths of flow of electrolyte during charging and discharging operations and the positioning of pressure-responsive membranes which can maintain inlets and outlets to the cells open or hold them tightly closed;

FIG. 2 is a partial vertical section corresponding to that of FIG. 1 but showing the membranes sealing off the cells during shutdown or standby;

FIG. 3 is a sectional view along plane 3—3 of FIG. 1;

FIG. 4 is a sectional view along plane 4—4 of FIG. 2;

FIG. 5 is a schematic view of the pump, piping and valves for effecting selective openings and closings of the cells by applying electrolyte pressures to different sides of the membranes;

FIG. 6 is a central vertical section of a bank or stack of electric cells similar to those of FIG. 1 but in which individual membrane members close off or open inlets or outlets from individual cells, showing the membranes in open position;

FIG. 7 is a vertical elevational view along plane 7—7 of FIG. 6;

FIG. 8 is an enlarged view of an exit port of FIG. 6; and

FIG. 9 is an enlarged view of the same exit port, wherein the membrane is in distended position, filled with fluid and closing off the exit duct with which it is associated.

In FIG. 1, a portion of a secondary battery of the zinc-zinc chloride-chlorine type is illustrated. It comprises a bank or stack 11 of individual cells 13, each of which includes different reactive surfaces 15 and 17 of bipolar electrodes 19 and 21, with contained electrolyte 23. The bipolar electrodes comprise a porous carbon or equivalent electrode base under surface 15 and a zinc or other suitable highly electropositive metal surface at 17. Aqueous zinc chloride electrolyte 23 containing dissolved chlorine (other metal halide-halogen systems may also be employed) is pumped by pumping means, not shown, through electrolyte inlet manifold duct 25, cell inlet opening or port 27, into reaction zone 29, out exit passageway or port 31 and through exit manifold or duct 33 back to the pump, through suitable piping and valves. Such flow is duplicated in other cells and the electrolyte portions flowing through them are fed to them by the pump and inlet manifold and are returned by the exit manifold to the pump inlet.

Flexible membranes 35 and 37 are provided in the inlet and outlet manifolds and are fastened to frame portions 39 and 41, at 43 and 45, respectively. They are also fastened at another end of the cell stack, not illustrated herein. The flexible membranes are pressed against walls 47 and 49 when electrolyte is flowing through the cells during charge or discharge periods. This is due to the pressure generated by the pump and transmitted through the electrolyte to the membranes, forcing them closer to the frame walls. However, when it is desired to have the cells sealed off during standby periods, it is a simple matter to direct the electrolyte to the frame sides of the membranes 35 and 37, away from the cell openings. By doing so, the pressure generated by the pump forces the membrane against the inlet and outlet ports and tightly seals them. Such sealed off position is shown in FIG. 2. Enlargements of the open and sealed positions of a membrane at a particular cell port are shown in FIGS. 3 and 4, respectively.

The means for directing electrolyte or other suitable fluid to either the cell opening or frame sides of the cell stack may be any of various suitable types. For example, a separate supply of electrolyte or other fluid may be utilized. The fluid may be a gas and the pressure at which it is allowed to enter the stack may be greater than that generated by the pumped electrolyte. The fluid can also be water or other suitable liquid. When fluids other than electrolyte are utilized, great care should be taken to assure that the flexible membrane, preferably of a synthetic organic plastic, will not leak and thereby cause dilution of the electrolyte or interference with its activity. Therefore, it is much preferred that the fluid utilized be the electrolyte and that it be pumped by the same pump normally used to circulate it through the cells.

As shown in FIG. 5, pump 51 pumps electrolyte fluid in the direction of the arrows, through valve 53 and to a manifold duct 25 at a position above membrane 35 of a vertically positioned cell stack 11. Valve 55 permits the return flow from the cells and duct 33 to the pump. Such circulation is maintained during the charging and discharging of the cell. When the battery is being shut down or held on standby, valve 53 is moved into position for directing the electrolyte pumped by pump 51 into line 57, from whence it proceeds through duct 25 to the frame side of the plastic membrane 35, pressing it against cell openings 27 and sealing them off. To seal off openings 31 with membrane 37, line 59 carries electrolyte from line 57 to duct 33, on the frame side of membrane 37. Of course, to maintain pressure against the membrane it may then be desirable to close off valve 55. Otherwise, check valve 61 will hold the pressure in the outlet manifold. Then too, other check valves, valving and piping arrangements may be utilized so as to facilitate transmission of hydraulic pressure to the ducts and to press the membranes against the cell ports.

Instead of utilizing cells of the design illustrated in FIGS. 1–4, other types may be employed, such as those wherein electrolyte feed into the cell is through the interiors of at least partially porous electrodes and those in which dual feeds are employed, some through the electrodes and some through entrances such as those illustrated. Such structures are shown in U.S. Patent applications identified as Ser. No. 200,041 and 199,911, filed the same day as the present application and entitled BIPOLAR ELECTRODE FOR CELL OF ENERGY DENSITY SECONDARY BATTERY and IMPROVING EFFICIENCY OF HIGH ENERGY DENSITY BATTERIES OF METAL-METAL HALIDE-HALOGEN TYPE BY BOUNDARY LAYER CONTROL, in the former of which the present inventor is a co-inventor and in the latter of which he is the sole inventor. Such disclosures are incorporated by reference in this application. However, the invention is adaptable to various batteries, including those using zinc-air and zinc-oxygen reactants. Where there are plural ports of entry or discharge from the cells, they can be closed by the sealing membranes illustrated in FIGS. 1–4, or by adaptations of such designs.

In FIG. 6 is shown a portion 63 of a bank or stack of electric cells of the same general type as illustrated in FIGS. 1–4, with the exception that individual flexible membranes are provided to close off each of the inlet and outlet ports. Thus, in the reaction zone 69 between bipolar electrodes 71 and 73 the electrolyte is held immobile by the closure of flexible membranes 75 and 77, which prevent communication of electrolyte 69 with electrolytes in adjacent cells 79 and 81 through inlet manifold 83 and outlet manifold or duct 85. As is shown in FIG. 7, in addition to the main electrolyte manifolds 83 and 85, additional manifolds 87 and 89 are provided, communicating through lines 91 and 93 with membranes 75 and 77 to transmit pressurizing fluid to the membranes and close off inlet 95 and outlet 97. The open and closed positions of the membranes are illustrated in FIGS. 8 and 9. Although the piping diagrams to the secondary manifolds 87 and 89 are not illustrated, it should be evident that various designs of pump-valves-piping arrangements may be used to selectively pressurize or relax the diaphragms to provide for closure or opening of the battery cells, as desired. For example, the secondary manifolds may be joined to a pump discharge line, as at 57 of FIG. 5, instead of being communicated with another line leading to the frame side of a membrane for closing of a plurality of cell openings. Additionally, a separate pressure system may be set up for the individual cell closing membranes, using a different electrolyte, if desired. Of course, instead of a whole series of electrolyte openings and closings being effected by a single manifold pressure change, single cell openings may be individually controlled or sections of cell stacks may be opened or closed together. Furthermore, although hydraulically operated membrane closures are highly preferred, if it is desired there may be utilized electrically, mechanically or other fluid operated closures for the cells, e.g., solenoid actuated gang or individual valves or membranes.

In operation, when the cell is to be shut down or placed on standby, it is a simple matter to turn valves 53 and 55 to feed pressurizing fluid to the frame side of the membranes and close off the cells, while pump 51 is still running. Then the pump may be shut off and appropriate check valves or other closing valves in the system will maintain the pressure. When it is desired to start up the battery, either for charging or discharging, the valves are turned so as to direct pressurizing fluid into the appropriate manifolds to open the cell inlet and outlet ports and pressure countering this opening is relieved by venting the fluid from the other sides of the membranes, releasing check valves or otherwise clearing a path for removal of the sealing fluid.

The flexible materials or insulating membranes employed may be of suitable pressure maintaining and electrolyte impermeable material, preferably of synthetic organic plastics. As shown in FIGS. 1–5, they may be sheet or strip materials capable of being sealed in tight contact with a cell stack frame or with electrode base parts. Among preferred plastics are polyethylene, polypropylene, polyvinyl chloride, afterchlorinated polyvinyl chloride, polytetrafluoroethylene, acrylonitrile-butadiene-styrene and acrylics, all of which are well known for making films or sheets. Although various thicknesses may be used it is preferred that the membranes be from 0.01 mm. to 1 mm. thick, more preferably from 0.04 to 0.5 mm. Sealing onto the frame or cell bases may be by resin gluing, cementing, thermal or solvent fusion, sonic welding, clamping, pressing, crimping, wedging, use of snap rings, or other adhesion, cohesion or mechanical techniques. The cell parts will often be of chlorinated rubber, porous carbon (including porous graphite), graphite, ABS resin or polypropylene and appropriate adhesives that can be employed include epoxy resins, rubbers, proteinaceous glues, and polyethers. In some cases conventional hot melt adhesives are employed.

In the preferred embodiments of the present invention high energy density secondary batteries comprise bipolar zinc-porous carbon or porous graphite electrodes and utilize a concentrated or substantially saturated aqueous zinc chloride with dissolved chlorine as the electrolyte, so that the chlorine on the porous carbon forms a chlorine electrode. Significantly longer battery lives and greater power discharge capabilities are obtained by utilization of the present invention for sealings off of the cells during prolonged shut down or standby periods. Useful lives of the batteries can be extended by as much as 20 percent by faithfully following the recommended shutdown procedures. In such batteries, instead of dissolved elemental chlorine, an equivalent form of the chlorine may be utilized, e.g., chlorine hydrate, which quickly yields chlorine in the electrodes or in the reaction zones of the cells. Corresponding improvements in efficiency and battery life are obtainable with other metal-metal halide-elemental halogen battery systems of this type. Instead of aqueous electrolyte as the pressurizing medium, comparable action is obtainable with water, other aqueous media and organic liquids. Furthermore, other fluids, such as gases, e.g., air, nitrogen, chloro-fluorinated lower hydrocarbons (Freons), may be employed, with the difference in operation being that the pump is replaced by a blower or gas compressor. Other locations of the membranes may be chosen and other membrane configurations may be employed, e.g., ellipsoids, cylinders, spheres, tubules, double-layered membranes, laminated membranes, membranes with shaped and reinforced closures to fit the port openings. The membranes employed are sufficiently strong so as to be useful over the expected life of the battery, e.g., five years. They do not require periodic replacement, cleaning or re-sealing. However, in the event that the battery is torn down for inspection and repairs, the membranes may be inspected and can be comparatively easily replaced, if necessary. Of course, in the systems described, various other operations may be carried out with other pieces of equipment, not illustrated in the drawing because they are not essential to the sealing off aspect of this invention. For example, provision may be made for removing halogen, e.g., chlorine, when charging the battery, and for adding zinc chloride. Similarly, when discharging, halogen is added to the depleted electrolyte. Such latter addition may be made by use of chemicals which release halogen in the electrolyte, e.g., chlorine hydrate.

The following examples illustrate but do not limit the invention. All temperatures are in °C. and all parts are by weight, unless otherwise indicated.

EXAMPLE 1

A bank of high energy density secondary cells is made of the design illustrated in FIGS. 1-4. The electrodes of the cells are bipolar and have chlorine on porous carbon at the anode and zinc at the cathodes. The zinc is 200 microns thick, deposited on an impervious surface adjacent to the porous carbon, e.g., graphite. The porous carbon is useful for passing through it an aqueous zinc chloride electrolyte at 25°-35°C., containing dissolved gaseous chlorine or the chlorine may be brought into contact with the electrode by being added in flowing electrolyte at the bottoms of the vertical cells and allowed to flow through and out the tops thereof. For simplicity of illustration and operation the cells shown in the FIGURES of this patent application have the electrolyte added to the intracell reaction zone through an inlet to the zone from a manifold, rather than by penetration of the walls of the porous electrode. The base parts of the cells are made of phenol formaldehyde plastic and the membranes are of polyvinyl chloride or polyethylene, preferably chlorinated polyethylene. If desired, polytetrafluoroethylene-on-cloth or on glass fibers may be employed.

In operation the cell described develops 2.1 volts, open circuit, and 1.65 to 1.7 volts at 8 amperes. In charging the electrolyte flow rate is about 600 milliliters per minute per cell and it is 400 mls. per minute per cell on discharge. The electrodes have faces of about 170 sq. cm. and the reaction volume between electrodes, constituting the cell space, is about 25 milliliters. Charging time is about 1-½ hours and at full load, the cells can be completely discharged in about an hour, although under less severe loads, they may be operated for as much as 10 hours or more.

As illustrated in FIG. 5 of the drawing, the valves are set to press the sealing membranes against the frames, leaving the ports open for flow of electrolyte during charging and discharging operations. During charging the chlorine produced is separated, converted to chlorine hydrate, and is subsequently employed in discharging operations as a source of chlorine. During charging the consumed zinc chloride is made up by addition of such salt to the circulating electrolyte. The average zinc chloride concentration in the electrolyte is about 25 percent and it varies from 15 to 35 percent, depending on whether the apparatus is being started or finished in the charge or discharge modes.

With membranes pressed against the frames by flowing electrolyte, leaving the inlets and outlets open, the operation of the bank of cells or the batteries made from these cells is entirely satisfactory and there is no indication of any interference with the battery operation by the membranes. However, when the battery is shut down, there is some internal shorting due to current flows between the cells through the electrolytes. Therefore, batteries composed of such cells are not allowed to stand more than one week or else they may be unacceptable for their normal tasks, such as running an electric automobile or truck. Therefore, when shutdown is planned, the values, illustrated in FIG. 5, will be changed so as to force flowing electrolyte against the cell openings. In such a position internal shorting is prevented and it is found that the batteries hold their charges longer, allowing as long as two weeks standing without shorting enough to prevent useful operation.

From this example it is seen that the sealing off of the cells in a high energy density battery of the type described appreciably increases the useful life of the battery between charges. Similar effects are obtained with other types of closures than the illustrated membranes. Such closures are electrically or mechanically operated and respond to gaseous fluid pressure, as well as liquid pressure. The invention is applied in cells which are charged by the passage of dissolved chlorine in contact with the carbon electrode in a metal-metal halide-halogen system in which the metal is deposited by plating out from the aqueous metal halide electrolyte or is employed in refuellable cells of this type, wherein the metal coating on the electrode base is periodically renewed or replaced ("refuelled").

In the embodiment of the invention illustrated, the preferred thickness of the diaphragm utilized is about 0.2 mm. and fastening to the base is by cementing to the phenol formaldehyde base material.

Instead of electrolyte being utilized as the pressurizing fluid to force the sealing membrane against the frame or the ports, gaseous fluids such as Freons and air and other liquids, such as water, may be employed but it is preferred that the pressurizing fluid be electrolyte, in case any leaks develop.

EXAMPLE 2

The operations of Example 1 are repeated utilizing the individual sealing means illustrated in FIGS. 6–9. Such means are made of the same materials and are utilized in batteries which employ the same electrolytes and operating conditions. The insulating membranes operate in the same way and similarly improve the life of the battery charge. The batteries so equipped are effective over a longer period of time than is the case with similar batteries without the sealing membranes.

The invention has been described with respect to illustrations and examples thereof but it is clear that it is not to be limited to these because equivalents may be substituted for elements or steps in the invention without departing from the spirit of the invention or going beyond its scope. For example the electrolyte may contain an aqueous metal halide ranging in concentration from about 0.5 percent by weight to saturation, preferably 5 percent to 50 percent, and even more preferably 10 percent to 35 percent. What is claimed is:

1. An apparatus for preventing internal short-circuiting of a plurality of electrical cells, each cell having an inlet means and an outlet means, comprising a common inlet manifold means for flow of electrolyte to the individual cells a common outlet manifold means for flow of electrolyte out of the individual cells, pumping means for circulating electrolyte through the inlet manifold to the cell inlet means, through the cells, out of the cell outlet means, and out of the common outlet manifold means, and a flexible electrolyte resistant membrane mounted in the common inlet manifold means and adapted to seal off the cells on standby when electrolyte flows against the membranes forcing the membranes against the cell inlet means, thereby blocking the cell inlet.

2. The apparatus of claim 1, further comprising a second flexible electrolyte resistant membrane mounted in the common outlet manifold means and adapted to seal off the cells on standby when electrolyte flows against the membranes forcing the membranes against the cell outlet means thereby also blocking the cell outlet.

3. A method for preventing internal short circuiting of a plurality of electrical cells each cell having a cell inlet means and a cell outlet means, a common manifold inlet means and a common manifold outlet means, comprising the steps:
   1. flowing electrolyte through the common inlet means, to the cell inlet means, through the cells and out of the cell outlet means and out of the common outlet means;
   2. while electrolyte is flowing as in Step number 1, forcing a flexible electrolyte resistant membrane, positioned in the common inlet manifold means, away from the cell inlet means by flow of the electrolyte;
   3. discontinuing the discharge of the cells; and
   4. forcing the flexible membrane against the cell inlet means by flowing the electrolyte into the common inlet manifold means, thereby sealing off the inlet of the cells and preventing flow of electrolyte through the cells.

4. The method of claim 3, further comprising the steps of:
   1. while electrolyte is flowing as in Step number 1, of claim 3, forcing a flexible electrolyte resistant membrane, positioned in the common outlet manifold means, away from the cell outlet means by flow of the electrolyte;
   2. discontinuing the discharge of the cells; and
   3. forcing the flexible membrane against the cell outlet means by flowing the electrolyte into the common outlet manifold means, thereby sealing off the inlet and outlet means of the cells.

5. The method of claim 3, wherein the cells are in an electrical energy storage device, where the reactants are zinc and chlorine and the electrolyte is an aqueous zinc chloride electrolyte.

* * * * *